United States Patent
Hanten

(10) Patent No.: US 6,216,425 B1
(45) Date of Patent: Apr. 17, 2001

(54) METHOD AND DEVICE FOR PRODUCING SAUSAGE-TYPE PRODUCTS WITH A FLEXIBLE TUBULAR OR POUCHLIKE WRAPPER

(75) Inventor: Jürgen Hanten, Rockenberg (DE)

(73) Assignee: Poly-Clip System GmbH & Co. KG, Frankfurt am Main (DE)

( * ) Notice: Subject to any disclaimer, the term of this patent is extended or adjusted under 35 U.S.C. 154(b) by 0 days.

(21) Appl. No.: 09/297,903
(22) PCT Filed: Oct. 14, 1997
(86) PCT No.: PCT/EP97/05645
  § 371 Date: Jul. 7, 1999
  § 102(e) Date: Jul. 7, 1999
(87) PCT Pub. No.: WO98/20746
  PCT Pub. Date: May 22, 1998

(30) Foreign Application Priority Data

Nov. 12, 1996 (DE) .............................................. 196 46 721

(51) Int. Cl.[7] .............................. B65B 9/15; B65B 57/02
(52) U.S. Cl. ................................... 53/450; 53/459; 53/53; 53/64; 53/550; 53/567
(58) Field of Search .................................. 53/53, 64, 567, 53/576, 450, 451, 550, 551, 552, 459; 452/31, 37

(56) References Cited

U.S. PATENT DOCUMENTS

| 3,396,426 | * | 8/1968 | Ziolko | 17/37 |
| 3,553,768 | * | 1/1971 | Wilmsen | 17/31 |
| 4,257,146 | * | 3/1981 | Karp | 17/31 |
| 4,558,488 |   | 12/1985 | Martinek . | |
| 4,642,849 | * | 2/1987 | Pierder | 53/576 |
| 4,646,386 | * | 3/1987 | Dreisin | 17/31 |
| 4,766,645 |   | 8/1988 | Lamartino et al. . | |
| 4,837,897 |   | 6/1989 | Lamartino . | |

FOREIGN PATENT DOCUMENTS

| 458969 | 8/1968 | (CH) . |
| 2050801 | 1/1981 | (GB) . |

\* cited by examiner

*Primary Examiner*—John Sipos
(74) *Attorney, Agent, or Firm*—Norris Mclaughlin & Marcus

(57) ABSTRACT

Method and apparatus for filling a packaging casing to produce a sausage-like product, wherein the tautness of the casing during both filling and closing is detected by a sensor and filling or closing is interrupted when the upper or lower limit for tautness is exceeded.

16 Claims, 1 Drawing Sheet

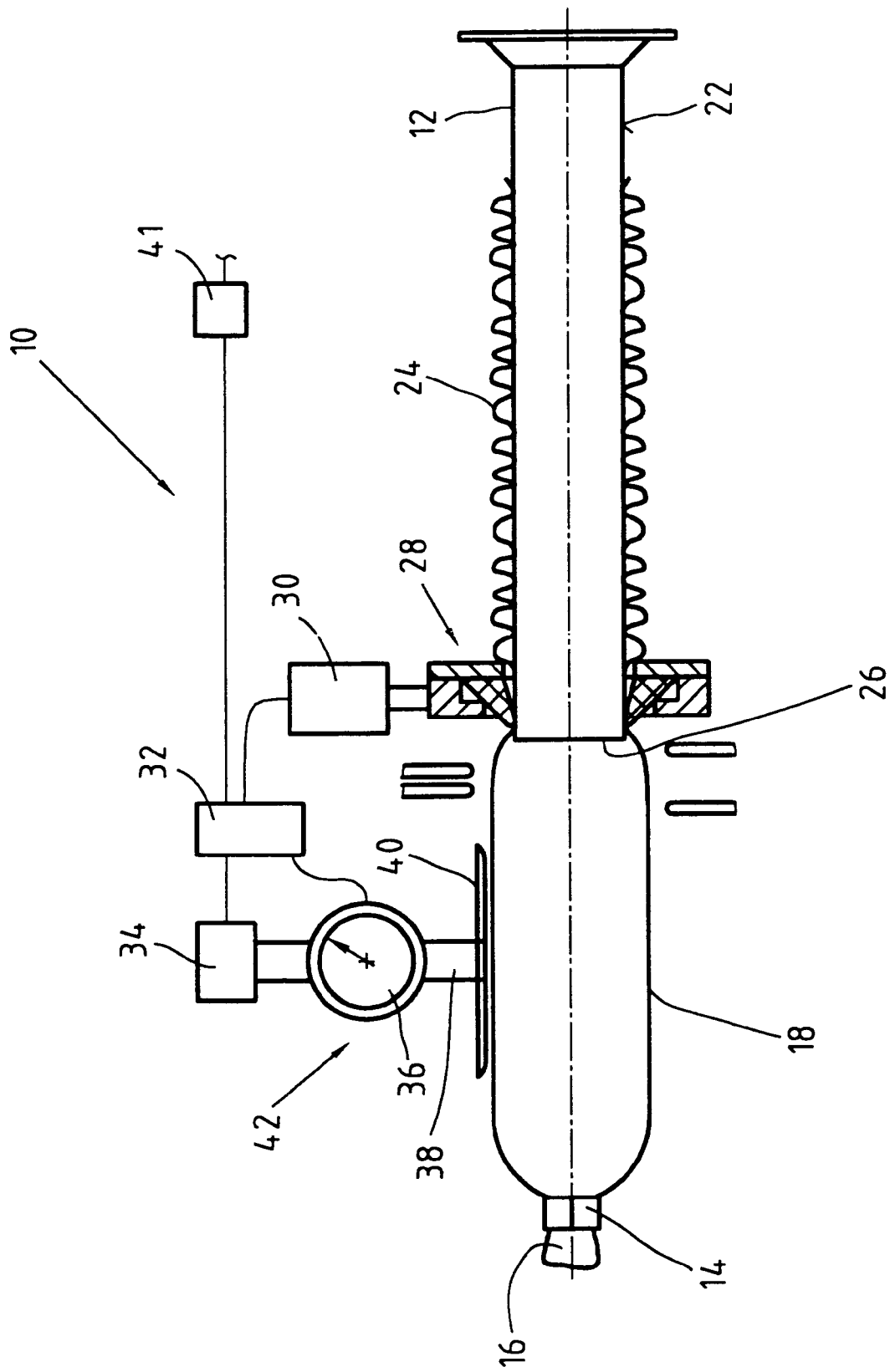

METHOD AND DEVICE FOR PRODUCING SAUSAGE-TYPE PRODUCTS WITH A FLEXIBLE TUBULAR OR POUCHLIKE WRAPPER

This invention relates to a method of producing sausage-like products, where for filling a tubular or bag-shaped packaging casing filling material is pressed into the unilaterally closed packaging casing, and the packaging casing material is withdrawn from a reservoir due to the filling pressure and thereby retarded by a casing brake, and the packaging casing is closed at a second end after it has been filled to the desired extent. The invention also relates to an apparatus for producing sausage-like products.

Known apparatuses for filling tubular or bag-shaped packaging casings with a filling material comprise a filling tube and a casing brake. The packaging casing to be filled is closed at one end and has been drawn onto the outside of the filling tube such that the closed end of the packaging casing is disposed before an outlet opening of the filling tube, while the rest of the packaging casing material forms a reservoir disposed on the outside of the filling tube. In the vicinity of the outlet opening of the filling tube, the packaging casing is pressed by the casing brake onto the outside of the filling tube with an adjustable force.

For filling the packaging casing, the filling material is pressed with a determinable filling pressure through the filling tube into the unilaterally closed packaging casing. In the process, further packaging casing material is withdrawn from the reservoir as a result of the filling pressure. The force required for withdrawing the packaging casing material can be adjusted by means of the casing brake. As a result of the adjustable braking force of the casing brake, which must be overcome by the filling pressure, tight and taut packages are obtained. When these packages contain the desired amount of filling material, they are closed at their other end and separated from the remaining packaging casing material. For closing purposes, the packaging casing material is usually crimped to form a neck, onto which two clips are then mounted at a certain distance from each other for keeping the packaging casing closed. Subsequently, the packaging casing is cut through between the two clips, so that one of the two clips keeps the already filled package closed at its second end, while the other clip forms the aforementioned unilateral closure of the packaging casing yet to be filled.

What is important is that the filled and closed package is taut enough. The tautness of the package depends on the internal pressure existing in the package. In particular in the case of sausages, this internal pressure should be so high that there is no deposition of jelly: In the case of sausages, the packaging casing is filled with pasty sausage meat, which among other things contains meat juice. When the internal pressure in the packaging casing after filling and closing the packaging casing is too low, the meat juice may accumulate and turn into jelly. The result is the undesired deposition of jelly, which can be prevented by a sufficient tautness of the package. The degree of tautness and accordingly the internal pressure in the packaging casing, which is sufficient for preventing the undesired deposition of jelly, depends on the kind of sausage meat.

In practice, there are some problems in connection with the above-described filling of packaging casings: The tautness of the finished package may for instance vary so much as a result of varying consistency of the filling material or non-uniform quality of the packaging casing that scrap is produced, because the package is not taut enough or too taut. In some cases, the packaging casing even bursts. The amount of scrap produced is often high, because with a production quantity of 100 to 150 sausages per minute there has often already been produced a major amount of scrap before the operating personnel of the filling machine detects the error.

Should a packaging casing burst already during filling, no further casing material will be withdrawn from the reservoir, because the required filling pressure can no longer be produced. This is the knowledge on which the apparatus described in DE-PS 44 12 697 is based, where a small wheel is rolling on the packaging casing at a fixed location and rotates when the packaging casing moves. From the rotation of the wheel it may be concluded that packaging casing material is indeed withdrawn from the reservoir during filling. Non-rotation of the wheel indicates that the packaging casing has burst during filling. Other production errors, in particular great fluctuations in tautness, cannot be detected with the known apparatus.

From U.S. Pat. No. 4,766,645 there is known a method where the outside diameter of a filled packaging casing is measured, and the measured value is used for setting a force required for withdrawing the packaging casing from a reservoir, so as to regulate the outside diameter of the sausage to the desired degree.

From GB-A-2,050,801 a method is known where there is measured the filling pressure with which a packaging casing is filled, in that the tensile stress is measured which exists in the still unfilled packaging casing when it is withdrawn from a reservoir. Since downstream of the point of measurement the packaging casing is also guided through a ring 19 whose inside diameter is smaller than that of the filled packaging casing, the friction between the packaging casing and the ring 19 leads to the fact that the tension of the packaging casing at the point of measurement does not correspond to the tension of the filled packaging casing. Since the packaging casing is closed downstream of the point of measurement, the already filled length of the packaging casing cannot be monitored with this method during closure.

All known methods are not satisfactory with respect to monitoring the production of sausage-like products if possible around the periphery thereof, so that production errors, for instance when closing the packaging casing, remain undetected.

It is therefore the object underlying the invention to indicate how scrap can be reduced in the production of sausage-like products.

In accordance with the invention, the solution of this object consists in a method as described above, where both during filling and during closing the tautness of the packaging casing is detected by means of a sensor, and filling or closing is interrupted both when an upper limit value for the tautness is exceeded and when a lower limit value for the tautness is not reached.

The tautness of the sausage results from the internal pressure of the filling material, which in turn depends on the filling pressure and the braking force of the casing brake. As a result of the internal pressure, the packaging casing is expanded more or less depending on the material, so that the tautness of a sausage is also indicated by its diameter. In the case of an elastic expansion of the sausage casing, there exists a restoring tension force inside the same, which is in equilibrium with the internal pressure of the sausage. The tension of the sausage casing exerts a measurable resistance, which depends on the tautness of the sausage, against a deformation of the sausage. The invention is based on the knowledge of the above-described relations and utilizes the fact resulting therefrom that the tautness of a sausage can be detected by means of sensors for instance from the force required for a deformation of the sausage casing or in the case of a defined action of force from the resulting deformation. The expansion of the sausage casing by the internal pressure existing inside the same leads to the fact that the filling diameter of the taut package after filling is larger than the nominal diameter of the unexpanded packaging casing. The increase in diameter as a result of the internal pressure in particular depends on the elasticity of the sausage casing. With a knowledge of this property, the tautness of a sausage can also be taken from its increase in diameter during filling. When the nominal diameter of the packaging casing is known, the tautness of the package may also be determined by measuring the filling diameter of the completely filled package.

An advantage of the method consists in that the tautness of the packaging casing is detected by means of a sensor also during the closing operation. As has already been described, for closing purposes the packaging casing is crimped to form a neck. This crimping of the packaging casing can also have an influence on the internal pressure of the sausage and thus on the tautness thereof. For precisely monitoring the tautness of the sausage it is therefore possibly desirable to include the closing operation in the monitoring of the tautness.

A method where the filling or closing operation is interrupted when an upper limit value for the tautness is exceeded or when a lower limit value for t he tautness is not reached provides for a substantial automation of the production of sausages while avoiding a major production of scrap.

There is furthermore preferred a method where the braking force of the casing brake is regulated in dependence on the detected tautness. For this embodiment of the method it is required that the tautness of the sausages is quantitatively detected continuously or in discrete intervals. Such quantitative value can be used for regulating the braking force of the casing brake, namely preferably in the sense that the braking force of the casing brake is reduced when the tautness of the packaging casing is larger than desired, and is increased when the tautness is smaller. This is based on the knowledge that the tautness of a sausage increases with increasing braking force of the casing brake, because to overcome the higher braking force a higher filling pressure is required. By means of the lastmentioned method sausages of a uniformly high quality can be produced, because deviations from the desired tautness of the sausages as a result of a varying consistency of the filling or a varying quality of the packaging casing are automatically compensated.

In one variant of the method the tautness is detected continuously. In an alternative method the tautness is detected in regular intervals.

A preferred variant of the method is characterized in that the tautness is detected by scanning the outside diameter of the packaging casing. There is furthermore preferred a method where for determining the tautness the force required for the deformation of the filled packaging casing is detected.

There is furthermore preferred a method where for determining the tautness a stamp is pressed onto the filled packaging casing, and the distance covered by the stamp or the force required for moving the stamp or both is recorded. From the line of force as a function of the distance covered by the stamp the tautness of the filled package can be inferred. It is in particular possible to compare the line of force with stored desired lines of force and possibly specifically act against existing deviations by adjusting the braking force of the casing brake. Therefore a method is particularly preferred where the values recorded for determining the tautness are compared with stored values.

For the inventive solution of the object there is furthermore proposed an apparatus as described above, which has a sensor for detecting the tautness of the packaging casing as well as a control unit which is connected with the sensor and compares values detected by the sensor with stored values, and which stops the apparatus if the measured values exceed an upper limit value for the tautness or fall below a lower limit value. The advantages of such apparatus already result from the fact that the inventive method can be performed by means of the same.

In a preferred embodiment of an apparatus with a regular casing brake, the apparatus has an operative connection from the sensor to the casing brake. Such apparatus satisfies the requirements for the above-described regulation of the tautness and thus provides for the automatic production of sausage-like products of high quality.

The sensor of the apparatus preferably has a stamp, which with one scanning surface can be pressed onto the outside of the filled packaging casing. By means of such stamp the outside diameter of the filled packaging casing can easily be scanned mechanically.

For moving the stamp, the apparatus preferably has a lifting means.

A preferred embodiment of the apparatus is characterized in that the sensor has a transducer for the adjusting path of the stamp or the force required for moving the stamp or for both. By means of such apparatus the pressing force with which the stamp is urged against the packaging casing can be measured, and the force required for deforming the filled packaging casing can be determined. It is for instance possible to move the stamp to such an extent that the packaging casing is slightly indented, and measure the required force. From the line of force the tautness of the package can be inferred. The line of force can be compared with measured values previously determined on a desirable package and be stored. From the deviations of the determined line of force from the stored line of force the product quality and possibly existing production errors can then be inferred.

The control unit is preferably connected with the transducer or the lifting means or both. The control means can on the one hand evaluate the measured values—thus serve as evaluating unit—and on the other hand actuate the lifting means with reference to the measured values from the transducer such that the stamp is not pressed onto the filled package too far or with too much force.

There is in addition preferred an apparatus where the control unit is connected with an adjusting member for adjusting the braking force of the casing brake. Such apparatus provides for performing the above-described regulation of the tautness by regulating the braking force.

The invention will now be explained in detail by means of the drawing with reference to an embodiment.

The drawing represents a schematic side view of a filling device comprising a casing brake and a scanning means for scanning the tautness of the sausage.

The filling device 10 comprises a filling tube 12, onto which a packaging casing 18 closed with a closure 14 at a front end 16 has been drawn such that part of the packaging casing forms a reservoir 24 on the surface 22 of the filling tube 12, and the front end 16 of the packaging casing 18 is disposed before an outlet opening 26 of the filling tube 12.

In the vicinity of the outlet opening 26 a casing brake 28 surrounds the surface 22 of the filling tube 12. The packaging casing 18 extends between the surface 22 and the casing brake 28 and is pressed onto the surface 22 by the casing brake 28. The casing brake 28 is connected with an adjusting member 30, by means of which the force can be adjusted with which the packaging casing 18 is pressed onto the surface 22 of the filling tube 12 by the casing brake 28.

For making a sausage, filling material is pressed through the filling tube 12 into the unilaterally closed packaging casing 18. As a result of the filling pressure, further packaging casing material is withdrawn from the reservoir 24. During this withdrawal, the packaging casing 18 is retarded by the casing brake 28 by means of friction. The braking force of the casing brake 28 acts against the withdrawal of the packaging casing from the reservoir 24 and must be overcome by the filling pressure. In the packaging casing 18 there is thus produced an internal pressure depending on the braking force of the casing brake 28, which makes the packaging casing 18 tight and taut. The tautness thus depends on the braking force of the casing brake 28 and can be adjusted by varying the braking force. For this purpose the adjusting member 30 is provided.

As soon as a portion of the packaging casing 18 has been filled with a desired amount of filling material, this portion of the packaging casing is closed at its second end. For this purpose, the packaging casing 18 is constricted before the outlet opening 26, so that there is obtained a neck free from filling material, which can be closed by means of two adjacent closure clips. Subsequently, the neck is cut through between the two closure clips. One of the two closures then keeps the second end of the completely filled packaging casing portion closed, while the other closure forms a new closure 14, which keeps the packaging casing 18 yet to be filled closed at its front end 16, so that a new filling operation can start.

In addition to the above-described features, the filling device 10 comprises a control unit 32, to which the adjusting member 30 is connected on the one hand, and on the other hand a lifting means 34 and a transducer 36. Both the lifting means 34 and the transducer 36 are connected with a stamp 38, which at its front end has a scanning surface 40. The stamp 38, its scanning surface 40 and the transducer 36 together form a sensor 42, by means of which the tautness of the packaging casing 18 can be detected.

For detecting the tautness, the stamp 38 with its scanning surface 40 is pressed onto the filled packaging casing 18 by means of the lifting means 34. Both the distance covered by the stamp 38 and the force required for moving the stamp are detected and transmitted to the control unit 32. The diameter of the packaging casing can be determined by evaluating how far the stamp 38 has been moved until the force required for moving the same was rising. This rise in force is connected with the fact that the scanning surface 40 has reached the packaging casing 18, so that for the further movement of the stamp an increased force is required for deforming the package. The amount of force required for the deformation of the packaging casing 18 depends on the tension of the packaging casing and the internal pressure existing inside the same, i.e. on the tautness of the package.

In the control unit 32 the measured values are evaluated by comparing them for instance with previously stored values for desirable packages. When the result of the evaluation is that the package is too taut, the control unit 32 makes the adjusting member 30 loosen the casing brake 28, so that a reduced braking force is obtained. Vice versa, the control unit 32 effects an increase of the braking force as soon as the measured values indicate that the package is less taut than desired.

Greatly differing measured values indicate major production errors, for instance that the packaging casing has burst. In such cases, the entire filling device can be switched off by the control unit 32 and shut-down switch 41.

Monitoring and regulating the tautness can also be effected when the packaging casing 18 is crimped for closing the same. The above described apparatus thus provides for a continuous control and regulation of the tautness of sausage-like packages and thus provides for a further automation of the production of sausage-like products and at the same time a reduction of the production of scrap.

What is claimed is:

1. A method of producing sausage-like products, where for filing a tubular or bag-shaped packaging casing filling material is pressed into the packaging casing closed at one end, and the packaging casing material is withdrawn from a reservoir due to the filling pressure and retarded by a casing brake, and the packaging casing is closed at a second end after it has been filled to the desired extent, wherein the tautness of the partially filled packaging casing (18) is measured during filling and during closing, and filling or closing is interrupted when an upper limit value for the tautness is exceeded or when a lower limit value for the tautness is not reached.

2. The method of claim 1, wherein the braking force of the casing brake (28) is regulated in dependence on the measured tautness.

3. The method of claim 2, wherein the braking force of the casing brake (28) is reduced when the tautness of the packaging casing (18) is greater than desired, and is increased when the tautness is less.

4. The method of claim 1, wherein the tautness is measured continuously.

5. The method of claim 1, wherein the tautness is measured at regular intervals.

6. The method of claim 1, wherein the tautness is measured by scanning the outside diameter of the packaging casing (18).

7. The method of claim 1, wherein, for measuring the tautness, the force required for the deformation of the filled packaging casing (18) is measured.

8. The method of claim 1, wherein, for measuring the tautness a stamp is pressed onto the filled packaging casing, and the distance covered by the stamp or the force required for moving the stamp or both is measured.

9. The method of claim 1, wherein the measured values for the tautness are compared with stored values.

10. An apparatus for producing sausage-like products with a tubular or bag-shaped packaging casing closed at both ends, comprising of filling mechanism for filling an open casing and a closing mechanism for closing the open casing, wherein the improvement comprising a sensor (42) for determining the tautness of the partially filled packaging casing (18) both during filling and during closing, as well as a control unit (32) which is connected with the sensor (42), and which compares the measured values detected by the sensor (42) with stored values, and which stops the apparatus if the measured values exceed an upper limit value for the tautness or fall below a lower limit value.

11. The apparatus of claim 10, comprising an adjustable casing brake (28), wherein the apparatus (10) has at least one operative connection from the sensor (42) to the casing brake (28).

12. The apparatus of claim 10, wherein the sensor (42) has a stamp (38), which with a scanning surface (40) can be pressed onto the outside of the filled packaging casing (18).

13. The apparatus of claim 12, wherein the apparatus has a lifting means (34) for moving the stamp (38).

14. The apparatus of claim 10, wherein the sensor (42) has a transducer (36) for adjusting the path of the stamp (38) or the force required for moving the stamp (38) or for both.

15. The apparatus of claim 13, wherein the control unit is connected with transducer (36) or the lifting means (34) or both.

16. The apparatus of claim 15, wherein the control unit (32) is connected with an adjusting member (30) for adjusting the braking force of the casing brake (28).

* * * * *